United States Patent [19]

Flesburg

[11] 4,294,303
[45] Oct. 13, 1981

[54] SAND CORE PATTERN AND METHOD OF FORMING A SAND MOLD

[75] Inventor: Edward E. Flesburg, Peoria, Ill.

[73] Assignee: Caterpillar Tractor Co., Peoria, Ill.

[21] Appl. No.: 195,719

[22] PCT Filed: Mar. 13, 1980

[86] PCT No.: PCT/US80/00268
§ 371 Date: Mar. 13, 1980
§ 102(e) Date: Mar. 13, 1980

[87] Pub. No.: WO81/02536
Pub. Date: Sept. 17, 1981

[51] Int. Cl.³ .................... B22C 7/00; B22C 9/02
[52] U.S. Cl. .................................... 164/44; 164/248
[58] Field of Search ............... 164/15, 34, 35, 44, 164/246, 248, 249; 249/57, 184

[56] References Cited

U.S. PATENT DOCUMENTS

| | | | |
|---|---|---|---|
| 118,693 | 9/1871 | Cornell | 164/248 |
| 3,247,548 | 4/1966 | Fields et al. | 249/184 X |
| 4,043,385 | 8/1977 | Petrenchik | 164/342 |
| 4,231,413 | 11/1980 | Bretzger | 164/15 |

FOREIGN PATENT DOCUMENTS

| | | | |
|---|---|---|---|
| 51-47522 | 4/1976 | Japan | 164/45 |
| 6752 | 3/1898 | Norway | 164/15 |

Primary Examiner—Robert D. Baldwin
Attorney, Agent, or Firm—Wegner, Stellman, McCord, Wood & Dalton

[57] ABSTRACT

A sand core pattern (11) for producing a one-piece cast wheel (10) having a radially inner shell (12), a radially outer blade support (13), and a plurality of angled blades (14) extending in a spaced, annular array (22). The pattern includes a plurality of similar segments (15), each having an inner end portion (18) defining a portion of the profile of the shell, and an outer end portion (21) defining the profile of the blade. The segments are supported in annular array about a mandrel (25) and are circumscribed by a split ring (26) defining the pattern for the outer blade support portion of the wheel (10). The inner portions of the segments are defined by angled side surfaces (16,17) which, in alternate ones of the segments in the annular array, converge and diverge toward the center of the array. Upon completion of the forming of the sand mold about the pattern, the mandrel and outer ring are removed, permitting the segments having the inwardly diverging side faces to be withdrawn inwardly from the array and permit the remaining segments then to be withdrawn inwardly therefrom.

30 Claims, 7 Drawing Figures

U.S. Patent Oct. 13, 1981 Sheet 1 of 2 4,294,303
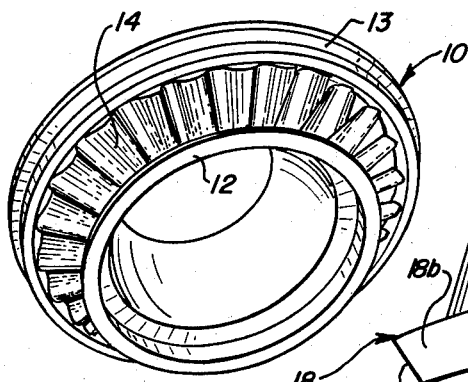
FIG. 1
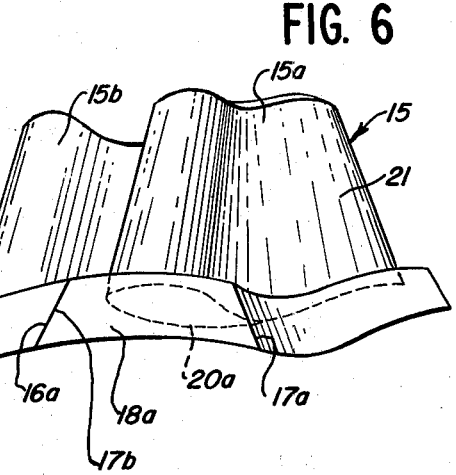
FIG. 6
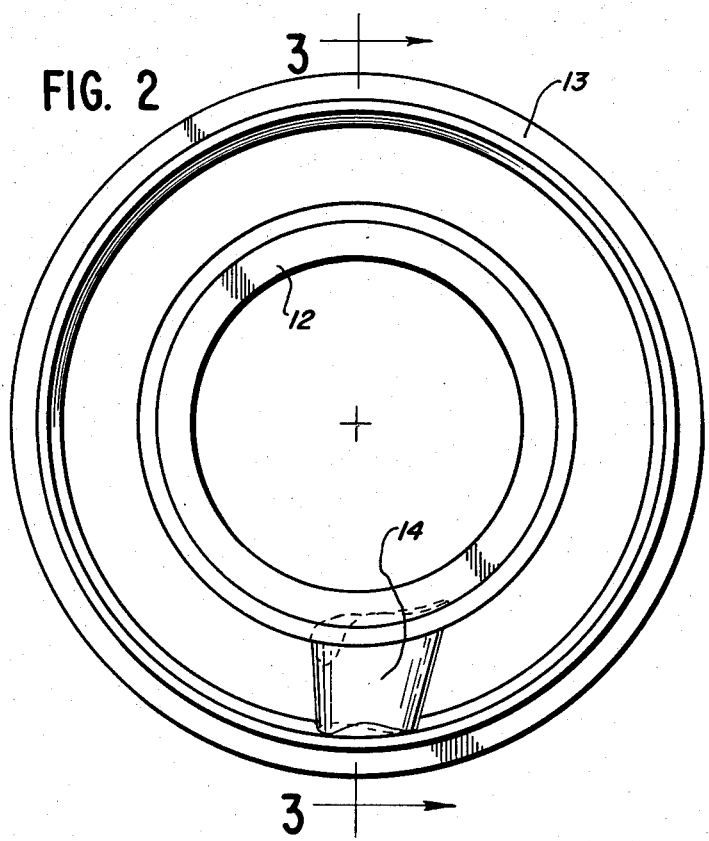
FIG. 2
FIG. 3

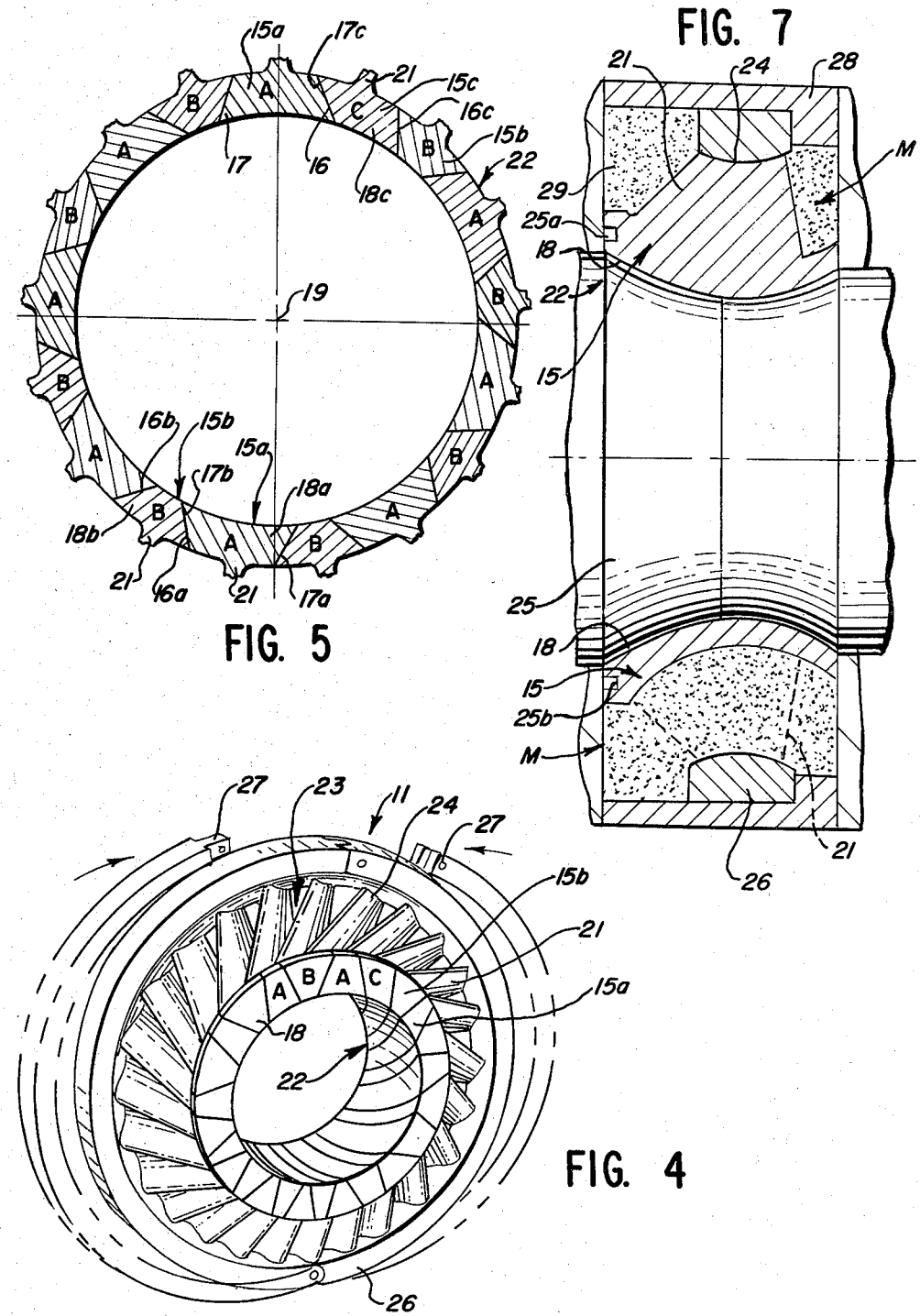

SAND CORE PATTERN AND METHOD OF FORMING A SAND MOLD

DESCRIPTION

TECHNICAL FIELD

This invention relates to a manufacture of a fluid flow deflector such as the stator of a torque converter, a compressor wheel for a turbine, etc.

BACKGROUND ART

In forming such flow deflectors, a number of different manufacturing techniques have been employed. In one such prior manufacturing technique, the individual blades of the stator were machined in segments and subsequently secured together to form the complete stator structure.

In another prior manufacturing method, the blade patterns were pegged into a shell ring prior to forming the sand mold thereabout. A problem arose in such manufacture in that variations in spacing and profile occurred in the patterns so that the stator was not completely uniform for providing a completely balanced flow of the fluid in the torque converter.

DISCLOSURE OF INVENTION

The present invention comprehends an improved sand core pattern for producing a one-piece cast wheel for use as a fluid flow deflector. The wheel includes a radially inner annular shell, a coaxial radially outer annular blade support, and a plurality of angled blades extending in a spaced annular array between the shell and blade support to define the desired fluid flow deflector.

The improved pattern includes a plurality of segments each having a first end portion defining a portion of the profile of the shell, and a second end portion defining the profile of one blade, means for supporting the segments in an annular array to define cumulatively a pattern structure corresponding to the configuration of the wheel shell and blade portion, and a removable outer ring encircling the array of segments to define a pattern for the blade support.

The invention comprehends that the segments be configured to permit radially inward removal thereof from the array upon removal of the supporting means.

In the illustrated embodiment, the inner end portions of the segments are tapered and, more specifically, are alternatively, in the array, tapered to sequentially widen inwardly and narrow inwardly.

More specifically, the side faces of the shell-forming portion of the segments define intersecting planes.

The outer ring illustratively comprises a split ring. In the illustrated embodiment, the ring defines a pattern preselected to permit suitable subsequent machining of the casting portion defined by the ring pattern to the final desired outer ring configuration.

The pattern is arranged so that upon removal of the support of the segments, every other segment may be removed by a radially inward movement thereof as a result of the inwardly widening configuration of the segment shell portion.

The invention comprehends that the segments be mounted annularly about a cylindrical mandrel in effecting the support thereof during the mold-forming steps. Upon removal of the mandrel at the completion of the sand mold formation, the segments may be withdrawn sequentially into the axial space previously occupied by the mandrel.

The outer ring may be withdrawn radially outwardly upon completion of the forming of the sand mold.

In the illustrated embodiment, the side faces of the shell portion of the segments taper at an included angle of approximately 60°.

The side faces of the adjacent segment shell portions resultingly define interlocking means which, in cooperation with the mandrel and outer locking ring, provide a positive, fixed retention of the elements of the pattern during the sand mold forming step.

Each of the segments may be readily formed by identical machining operations so as to provide uniformity in the blade configuration throughout the array. The shell portion of each of the segments may be machined to define selectively the inwardly and outwardly diverging angular configuration discussed above.

As a result, the cast wheel may comprise a totally uniform configuration to provide a completely balanced flow of fluid therethrough. The sand core pattern and method of forming the sand mold utilizing the pattern of the invention are extremely simple and economical while yet providing the highly improved cast wheel structure.

BRIEF DESCRIPTION OF THE DRAWING

FIG. 1 is a perspective view of a cast wheel manufactured in accordance with the invention;

FIG. 2 is a side elevation thereof;

FIG. 3 is a vertical section taken along the line 3—3 of FIG. 2;

FIG. 4 is a perspective view illustrating the sand core pattern in partially assembled relationship for use in forming the sand mold to produce the wheel of FIG. 1;

FIG. 5 is a fragmentary radial section illustrating the interlocked relationship of the shell portions of the segments defining a portion of the pattern;

FIG. 6 is a side elevation of a pair of adjacent segments of the annular array thereof illustrated in FIG. 4; and FIG. 7 is a diametric section of the structure upon completion of the flowing of the sand to define the sand mold about the pattern illustrated in FIG. 4.

BEST MODE FOR CARRYING OUT THE INVENTION

In the exemplary embodiment of the invention as disclosed in the drawing, an improved method of manufacture of a stator wheel 10, or the like, is shown to comprise the formation of a pattern generally designated 11 for producing the wheel 10 as a one-piece cast wheel in a novel and simple manner.

As shown in FIG. 1, the wheel includes a radially inner annular shell portion 12, a coaxial radially outer blade support 13, and a plurality of angled blades 14 extending in a spaced annular array between the shell and blade support to define a fluid flow deflector, such as for use in a torque converter stator structure.

The blades 14 are of complex configuration and it is desirable to arrange the blades in the array illustrated in FIG. 1 in accurately positioned and spaced relationship so as to provide a completely balanced and uniform wheel 10. The present invention permits the individual blades 14 to be defined by identical segments 15 of the pattern 11 which differ only in the angularity of the circumferentially opposite side faces 16 and 17 of an inner end portion 18 of the segments.

As best seen in FIGS. 4 and 5, segments 18a define planar side faces 16a and 17a which converge radially outwardly from the axis 19 of the segment array. Segments 15b define planar side faces 16b and 17b which converge radially inwardly in facial abutment with surfaces 16a and 17a of the adjacent segments 15a. In the illustrated embodiment, the included angle between faces 16a and 17a and, thus, between faces 16b and 17b, is approximately 60°. As shown in FIG. 5, faces 16b and 17b intersect in spaced relationship to axis 19.

Segments 15a, as shown in FIG. 6, include a first inner end portion 20a defined by the planar surfaces 16a and 17a, and segments 16 include a corresponding first inner end portion defined by surfaces 16b and 17b. Each of the segments defines a similar blade portion 21. As shown in FIG. 4, the side surfaces of the inner end portions of the segments are curvilinear.

In the illustrated embodiment of FIG. 5, an odd number of segments is utilized requiring the provision of a third form of segment 15c at one position in the annular array generally designated 22. Segment 15c includes an inner end portion 18c wherein the side surfaces 17c and 16c extend at an angle suitably to engage the counterclockwise side surface of the adjacent segment 15b and the clockwise side surface of the adjacent segment 15a.

As can be seen in FIGS. 4 and 5, the annular array 22 of the segments defines a complete annulus wherein the inner portions 18 define an inner continuous ring and the blades 21 are spaced apart uniformly at a uniform angle to define a fluid flow deflector pattern 23.

The annular array 22 is formed about a transversely split mandrel 25, which, as illustrated in FIG. 7, has an outer arcuate configuration corresponding to the desired inside configuration of the finished stator wheel. As the segments are being installed, they are held in place by a lock ring 25a positioned in a groove 25b located in the inner portion 18 of the segments 15. After the annular arrangement is completed, an outer ring 26, which forms a portion of core box 28, is brought into encircling relationship to the outer tips 24 of the blades, as shown in FIG. 4. (The mandrel 25 is omitted in FIG. 4 to facilitate showing of the arrangement of the segments.) Outer ring 26 and core box 28 preferably comprise a split ring which includes locking means 27 for causing firm embracing of the blade tips 24 in the annular array of the segments.

After the pattern is assembled on the mandrel 25 and with the outer ring 26 installed, as shown in FIG. 7, molding sand 29 may be packed around the pattern and subsequently cured to form the desired sand mold M in which the stator wheel 10 is cast.

Sand mold M is then removed from the core box 28 and mandrel 25 and split ring 26 are removed. Removal of mandrel 25 from annular array 22 permits the removal of the segments 15 sequentially from the annular array. More specifically, upon removal of mandrel 25, segments 15a may be removed by a radially inward withdrawal thereof from the annular array as permitted by the inwardly widening side surface configuration. Upon removal of segments 15a, segments 15b, and segment 15c when used, may then be removed to complete the removal of the pattern from the sand mold for subsequent casting of the stator wheel 10 in the formed mold.

As the inner portions 18 of the respective segments effectively define a continuous annular ring portion of the pattern, as seen in FIGS. 4 and 5, the sand mold correspondingly defines a continuous ring cavity for defining the shell 12 of the wheel 10, seen in FIG. 1.

Further, as each of the segment blade portions 21 was accurately and positively positioned in the annular array 22, the resultant cast blades 14 are similarly accurately spaced and positioned in the wheel 10.

As illustrated in FIG. 3, the configuration of the split ring 26 may not correspond exactly to the desired final configuration of the blade support 13. Thus, illustratively, the outer portion of the casting may comprise a rectangular section ring which may be suitably machined to the final configuration of the blade support 13, as shown in FIG. 3.

As further illustrated in FIG. 3, the shell 12 may be further machined at its opposite ends 30 and 31, as desired.

INDUSTRIAL APPLICABILITY

The cast wheel structure of the present invention provides an improved uniform, accurately configured complex-shaped structure which is adapted for use in a wide range of industrial applications, such as the stator of a torque converter wherein it is desirable to provide accurate, uniform blade deflectors at low cost.

As the pattern for the casting mold is made up of a plurality of readily repeatable machined segments, high accuracy in the configuration of the pattern and, as a result, the configuration of the casting made from the mold formed by the pattern, is obtained.

As indicated above, the structural and method concepts are adapted for providing either an even number or odd number of blades in the cast wheel as desired. As will be obvious to those skilled in the art, where an even number of blades is desired, the segment 15c is omitted and the circumferential extent of each of the segments 15a and 15b correspondingly increased to form the continuous annular array defining the shell portion of the wheel.

The invention permits the production of sand cores for castings in such relatively complex-shaped castings as wheel 10 by numerical control machining steps in forming the individual segments. The interlocking angle of the side surfaces of the segments assures that the blade portions thereof are effectively accurately retained while the molding sand is being packed around the pattern, thereby assuring a uniform blade arrangement. Where the wheel is utilized as a torque converter stator, such uniform stator configuration provides a highly desirable balanced flow of fluid through the diverter means.

While the invention is disclosed in connection with the stator wheel construction of FIG. 1, as will be obvious to those skilled in the art, the novel segmented pattern concept and pattern forming process of the invention may be utilized in conjunction with a wide range of different annular configurations.

Other aspects, objects and advantages of this invention can be obtained from a study of the drawings, the disclosure and the appended claims. The foregoing disclosure of specific embodiments is illustrative of the broad inventive concepts comprehended by the invention.

I claim:

1. A reusable pattern (11) for forming a sand mold for casting a one-piece wheel (10) having a radially inner, annular shell (12), a coaxial radially outer, annular blade support (13) and a plurality of angled blades (14) extending in a spaced annular array (22) between said shell and blade support to define a fluid flow deflector, said pattern comprising:

a plurality of segments (15) each having a first end portion (18) defining a segmentally annular portion of the profile of the shell, and a second end portion (21) defining the profile of a single blade;

means (25) for supporting the segments in an annular array (22) to cause said segments to define cumulatively a pattern structure corresponding to the annular shell configuration and the blade of said wheel; and a removable outer ring (26) encircling said array of segments to define a pattern (11) for the blade support (13).

2. The reusable pattern (11) of claim 1 wherein said segments (15) are configured to permit selective radially inward removal thereof from the array (22) of segments upon removal of the supporting means (25).

3. The reusable pattern (11) of claim 1 wherein said first end portions (18) of said segments (15) are tapered.

4. The reusable pattern (11) of claim 1 wherein said first end portion (18) of at least one segment (15) is tapered to widen radially inwardly to permit radially inward removal thereof from the array (22) of segments upon removal of the supporting means (25).

5. The reusable pattern (11) of claim 1 wherein said first end portion (18) of every other segment (15) is tapered to widen radially inwardly to permit radially inward removal thereof from the array (22) of segments upon removal of the supporting means (25).

6. The reusable pattern (11) of claim 1 wherein said first ends (18a,18b) of said segments are alternatively tapered in the array (22) to widen alternatively inwardly and outwardly.

7. The reusable pattern (11) of claim 1 wherein said outer ring (26) comprises a split ring.

8. The reusable pattern (11) of claim 1 wherein said outer ring (26) comprises a selectively lockable split ring.

9. The reusable pattern (11) of claim 1 wherein said first ends (18a,18b) of said segments are alternatively tapered in the array (22) to widen alternatively inwardly and outwardly and said outer ring (26) comprises a selectively lockable split ring for preventing radially outward movement of the segments (15b) having their first ends (18b) widening outwardly.

10. The reusable pattern (11) of claim 1 wherein the circumferentially opposite sides (16,17) of the first ends of the segments define curved intersecting surfaces.

11. The reusable pattern (11) of claim 1 wherein said plurality of blades (14) comprises an odd number.

12. The method of forming a sand mold (M) to form a one-piece wheel (10) having an annular inner shell (12), an annular outer support (13), and a plurality of angled blades (14) extending in a spaced annular array (22) between the shell and support, said method comprising the steps of:

forming a plurality of pattern segments (15) each having a first end portion (18) defining a segmentally annular portion of the profile of the shell, and a second end portion (21) defining the profile of a single blade;

supporting the segments (15) in an annular array (22) to cause said segments to define cumulatively a pattern structure corresponding to the annular shell configuration and the blades of said wheel;

securing a removable outer ring (26) about the array (22) of segments to define a pattern (11) for said outer support (13);

forming a sand mold (M) about the associated patterns (11);

discontinuing the support of the segments (15);

removing the outer ring (26) from the mold; and removing the segments (15) from the mold by movement of said segments inwardly toward the axis (19) of said annular array (22) of segments.

13. The method of forming a sand mold of claim 12 wherein the step of supporting the segments (15) comprises a step of providing a cylindrical mandrel (25) and mounting the segments (15) about the mandrel.

14. The method of forming a sand mold of claim 12 wherein the step of supporting the segments (15) comprises a step of providing a cylindrical mandrel (25), mounting the segments (15) about the mandrel, and interlocking the segments to each other.

15. The method of forming a sand mold of claim 12 wherein every other one (15a) of the segments (15) in the annular array (22) is tapered to widen radially inwardly and removed prior to the removal of the other segments (15b,15c).

16. The method of forming a sand mold of claim 12 wherein the circumferentially opposite sides (16,17) of the first ends of the segments (15) define curved intersecting surfaces with the side surfaces (16a,17a) of every other segment (15a) in the array (22) converging away from the axis (19) of the array, permitting said every other segment (15a) to be removed radially inwardly prior to removal of the other segments (15b,15c).

17. The method of forming a sand mold of claim 12 wherein the circumferentially opposite sides (16,17) of the first ends of the segments (15) define curved intersecting surfaces with the side surfaces (16a,17a) of every other segment (15a) in the array (22) converging away from the axis (19) of the array, permitting said every other segment (15a) to be removed radially inwardly prior to removal of the other segments (15b,15c) at an included angle of approximately 60°.

18. The method of forming a sand mold of claim 12 wherein said segments (15) are formed by machining.

19. A reusable pattern (11) for forming a sand mold for casting a one-piece wheel (10) having a radially inner, shell ring (12), a coaxial radially outer, blade support ring (13), and a plurality of angled blades (14) extending in a spaced annular array (22) between said rings to define a fluid flow deflector, said pattern comprising:

a plurality of segments (15) each having a first end portion (18,21) defining a segmentally annular portion of the profile of one of said rings (12,13), and a second end portion (18,21) defining the profile of a single blade;

means (25) for supporting the segments in an annular array (22) to cause said segments to define cumulatively a pattern structure corresponding to the configuration of said one ring and blades of said wheel; and a removable ring (26) coaxially of said array of segments to define a pattern (11) for the other of said rings (12,13).

20. The reusable pattern (11) of claim 19 wherein said segments (15) are configured to permit selective radially directed removal thereof from the array (22) of segments upon removal of the supporting means (25).

21. The reusable pattern (11) of claim 19 wherein said first end portions of said segments (15) are tapered.

22. The reusable pattern (11) of claim 19 wherein said first end portion of at least one segment (15) is tapered to widen radially to permit radially directed removal thereof from the array (22) of segments upon removal of the supporting means (25).

23. The reusable pattern (11) of claim 19 wherein said first end portion of at least one segment (15*b*) is tapered to widen radially outwardly.

24. The reusable pattern (11) of claim 19 wherein the circumferentially opposite sides (16,17) of the first end portions of the segments define curved intersecting surfaces.

25. The reusable pattern (11) of claim 19 wherein said plurality of blades (14) comprises an odd number.

26. The method of forming a sand mold (M) to cast a one-piece wheel (10) having an inner shell ring (12), an outer support ring (13), and a plurality of angled blades (14) extending in a spaced annular array (22) between the shell and support rings, said method comprising the steps of:

forming a plurality of pattern segments (15) each having a first end portion (18,21) defining a segmentally annular portion of the profile of one of said rings (12,13), and a second end portion (18,21) defining the profile of a single blade;

supporting the segments (15) in an annular array (22) to cause said segments to define cumulatively a pattern structure corresponding to the configuration of said one ring of the wheel and the blades of said wheel;

securing a removable ring (26) coaxially of the array (22) of segments to define a pattern (11) for the other of said rings (12,13);

forming a sand mold (M) about the associated patterns (11);

discontinuing the support of the segments (15); and removing the ring (26) and the segments (15) from the mold.

27. The method of forming a sand mold of claim 26 wherein the step of supporting the segments (15) comprises a step of providing an annular support and mounting the segments (15) concentrically of said support.

28. The method of forming a sand mold of claim 26 wherein the step of supporting the segments (15) comprises a step of providing an annular support and supporting the first end portion of the segments thereon.

29. The method of forming a sand mold of claim 26 wherein each of the segments (15) in the annular array (22) is tapered.

30. The method of forming a sand mold of claim 26 wherein the circumferentially opposite sides (16,17) of the first ends of the segments (15) define curved intersecting surfaces.

* * * * *